Feb. 28, 1956 G. SLAYTER ET AL 2,736,362
FIBROUS MAT AND METHOD AND APPARATUS FOR PRODUCING SAME
Filed June 29, 1951 10 Sheets-Sheet 1

INVENTORS:
GAMES SLAYTER, HENRY J. SNOW,
BY SAMUEL D. PHILIPPS.
ATTORNEYS.

Feb. 28, 1956  G. SLAYTER ET AL  2,736,362
FIBROUS MAT AND METHOD AND APPARATUS FOR PRODUCING SAME
Filed June 29, 1951  10 Sheets-Sheet 2

INVENTORS:
GAMES SLAYTER, HENRY J. SNOW,
BY SAMUEL D. PHILIPPS.
ATTORNEYS.

Feb. 28, 1956  G. SLAYTER ET AL  2,736,362
FIBROUS MAT AND METHOD AND APPARATUS FOR PRODUCING SAME
Filed June 29, 1951  10 Sheets-Sheet 5

INVENTORS:
GAMES SLAYTER, HENRY J. SNOW,
BY SAMUEL D. PHILIPPS.
ATTORNEYS.

Feb. 28, 1956   G. SLAYTER ET AL   2,736,362
FIBROUS MAT AND METHOD AND APPARATUS FOR PRODUCING SAME
Filed June 29, 1951   10 Sheets-Sheet 6

INVENTORS:
GAMES SLAYTER, HENRY J. SNOW,
BY SAMUEL D. PHILIPPS.
ATTORNEYS.

Feb. 28, 1956    G. SLAYTER ET AL    2,736,362
FIBROUS MAT AND METHOD AND APPARATUS FOR PRODUCING SAME
Filed June 29, 1951    10 Sheets-Sheet 9

INVENTORS:
GAMES SLAYTER, HENRY J. SNOW,
BY SAMUEL B. PHILIPPS.
ATTORNEYS.

2,736,362
Patented Feb. 28, 1956

2,736,362

FIBROUS MAT AND METHOD AND APPARATUS FOR PRODUCING SAME

Games Slayter and Henry J. Snow, Newark, and Samuel D. Philipps, Granville, Ohio, assignors to Owens-Corning Fiberglas Corporation, Toledo, Ohio, a corporation of Delaware Application June 29, 1951, Serial No. 234,252

26 Claims. (Cl. 154—29)

This invention relates to mats or bats of fibers and method and apparatus for producing same, the invention more especially relating to the production of mats or bats of multilayer or laminar construction fabricated of fibers from mineral materials.

Heretofore in the production or manufacture of fibrous insulating units, it has been a usual practice to form a binder-impregnated, haphazardly arranged mass of mineral fibers, cure the binder and subdivide the mass into mats or bats of desired dimension suitable for heat or sound insulation or other purposes. In forming bats or mats of this character, the fibers are produced from fusible minerals such as fusible rock, slag, or glass by flowing streams of glass or other material from a supply and attenuating, fiberizing or drawing out the streams to fiber form by engaging the streams with blasts of steam or other gas and as the fibers are formed, a suitable binder usually in aqueous solution or suspension is applied thereto.

The fibers thus formed are collected in a haphazard mass upon a movable foraminous conveyor, the mass being moved through fixation rollers to establish a desired thickness and density of the fibrous assembly which is then conveyed through a curing zone or oven of a suitable temperature to cure or set the binder and thus impart mass integrity to the fibrous assembly. The fibrous assembly is then cut or severed into sizes especially adaptable for installations of the mats or bats for particular purposes as for insulating stoves, refrigerators, and other allied uses.

The methods employed in spraying or applying a binder onto the fibers may not facilitate or result in a uniform distribution of the binder through the fibers and hence in many instances the bats or mats have zones of concentrations of the binder while other zones may be sparsely treated with the binder. A lack of homogeneity of the binder constituent in the mass may reduce the insulating efficiency as concentrations of the binder material provide a facile path for the transfer or transmission of heat.

In forming mats or bats of fibers in the foregoing mentioned manner, the fibers are of indiscriminate lengths; and under the influence of the turbulence existing in the fiber forming hood augmented by the presence of the binder, the fibers are deposited in a haphazard mass with fibers of varying lengths extending in all directions. In such an assembled mass, many of the fibers extend from one major face of the mass to the other. The fibers that extend through the mat provide a direct medium or path for conveying heat readily from one face to the other and as mineral fibers have a relative heat conductivity factor higher than air, the insulating value of the mat or bat may in many instances be impaired or reduced by such condition.

By reason of the haphazard assembly of the fibers at the time of their formation into a single agglomerate or mass, control of orientation or positioning of individual fibers or groups of fibers is practically impossible, and the insulating value of fibrous mats or bats fabricated by such methods may vary over a wide range dependent upon the number of fibers in a given zone extending crosswise or transversely through the mat.

In applying the binder to the fibers, an aqueous solution or suspension is utilized which is usually low in solids or binder content in attempting to secure a distribution of the binder among the fibers. The application of the binder in a liquid injected onto the fibers in the forming chamber and the presence of lubricants applied to the fibers to reduce interabrasion have a tendency to interfere with an even fall of the fibers and cause them to become entangled as they move to the collecting surface. The fibers are collected upon a foraminous surface aided by suction or reduced pressure. As the fibers build up into a comparatively thick mass, back pressures of the fiber attenuating gases may be encountered in the fiber forming chamber as the suction is diminished by the gradual increase in thickness of the collected mass, a condition fostering turbulence in the fiber forming chamber and formation of wads or clumps of fibers. The presence of wads or tangled clumps of fibers in the mat tends to reduce the insulating efficiency of the product.

Furthermore, the aqueous constituents of the binder application must be vaporized or driven off in the binder curing process, an operation requiring a large amount of heat and hence increasing the cost of the product.

The present invention embraces a method and apparatus for producing fibrous mats or assemblies wherein the cost of fabrication thereof is greatly reduced and the insulating value or efficiency of the product improved over prior fibrous mat constructions.

An object of the invention resides in a method and apparatus for forming a relatively thin veil, web or stratum of attenuated fibers folded or lapped upon itself to form a mat in a manner eliminating the projection of individual fibers from one major face of the mat to the other.

The method of the invention embraces the steps of forming fibers of mineral material and collecting them in individual layers or webs which are caused to be brought into contiguous relation to form a relatively thin layer or veil of a laminated character wherein the fibers of one layer do not extend or project through to the outer surface of the other layer whereby the insulation factor is greatly improved over prior fibrous insulating units.

An object of the invention resides in a method of forming and collecting masses of mineral fibers in spaced zones, bringing the collected masses into contiguous relation and applying a binding material in a manner whereby the material is distributed through the contiguous layers of fibers thus augmenting the insulating efficiency by reason of the uniform distribution of binding material in and throughout the layers of fibers.

Another object of the invention resides in the production of a fibrous mat having high insulating characteristics with a minimum amount of fibrous material.

Another object of the invention resides in a method of attenuating streams of mineral material to fibers in separated groups and orienting the groups of fibers in coincident relation to form a depending multilayer veil which is continuously folded upon itself to form an insulating mat of many layers of the veil assembled in angular or echelon relation whereby the insulating characteristics of the mat are improved with a minimum of weight and thickness.

Another object of the invention is the provision of apparatus for continuously forming and collecting groups of fibers into individual layers and bringing the layers into contiguous relation and applying a comminuted or powdered binding material to the layers of fibers and vibrating or agitating the layers to facilitate the distribution of the binding material throughout the layers of fibers.

Another object is the provision of a fibrous mat of laminar construction wherein the layers or laminations are impregnated with a bonding material prior to their assembly into mat formation to secure substantially uniform distribution of the material throughout the laminar mat construction and thus attain a high degree of mass integrity without reducing the effectiveness of the insulating characteristics of the mat.

A further object of the invention resides in an apparatus embodying juxtaposed relatively movable fiber collecting surfaces upon which layers of fibers are continuously deposited, the surfaces being movable in a direction or manner to bring the layers into contiguous relation to form a comparatively thin dual stratum or layer veil of fibers, the arrangement including means to fold or lap the stratum or layer upon itself to continuously and progressively form a laminar mat construction of a character wherein none of the fibers extend from one planar surface of the mat to the other.

Another object of the invention resides in a method of collecting attenuated mineral fibers upon a foraminous surface under the influence of reduced pressure to form a thin veil of fibers and wherein fibers that may be drawn through the foraminous surface are retrieved and returned to the fiber collecting zone for refabrication.

Another object resides in a method and apparatus for applying a bonding material in comminuted form to an assemblage of fibers by directing an air stream in which the material is entrained through the assemblage of fibers while the latter is disposed in a substantially vertical position and agitating the assemblage to aid in the distribution of the material therein.

Another object of the invention resides in an arrangement of applying a binding material to a layer of fibers wherein excess binding material is retrieved and subsequently returned to the applying zone whereby substantially all of the binding material is effectively utilized.

Another object is the provision of a laminar construction of fibrous mat wherein the laminations are disposed in angular relation with respect to the major faces of the mat whereby the insulating characteristics are improved.

Still another object is the provision of a fibrous mat formed of two or more tiers or layers of fibers, each tier or layer composed of laminations or webs of fibers arranged in angular relation with respect to the major faces of the layer whereby a mat is formed having high insulating characteristics.

The method of the present invention involves several steps or operations which are continuously carried on at successive stations and in the main includes the following: A furnace or apparatus for reducing fiber forming material to flowable condition and flowing streams of the material to attenuating zones wherein the newly formed fibers are directed to juxtaposed collecting stations, the collected fibers being brought into a contiguous relation to form a dual layered veil. The veil is moved to a zone at which a bonding material is applied to and distributed throughout the fibers, the binder impregnated veil being acted upon by means effective to continuously fold or lap the veil upon itself into superposed layers in angular echelon pack or mass formation, the multilayered or laminar pack being sized and directed through a curing station or oven where the bonding material is set to form a mat endowed with a high degree of mass integrity.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

While the apparatus illustrated is especially adapted for forming mat constructions from fibers of glass, it is to be understood that the principles of the invention may be utilized for producing fibrous products from other fibers such as those formed from fusible rock or slag, thermoplastic resins and the like.

Figures 1, 2:
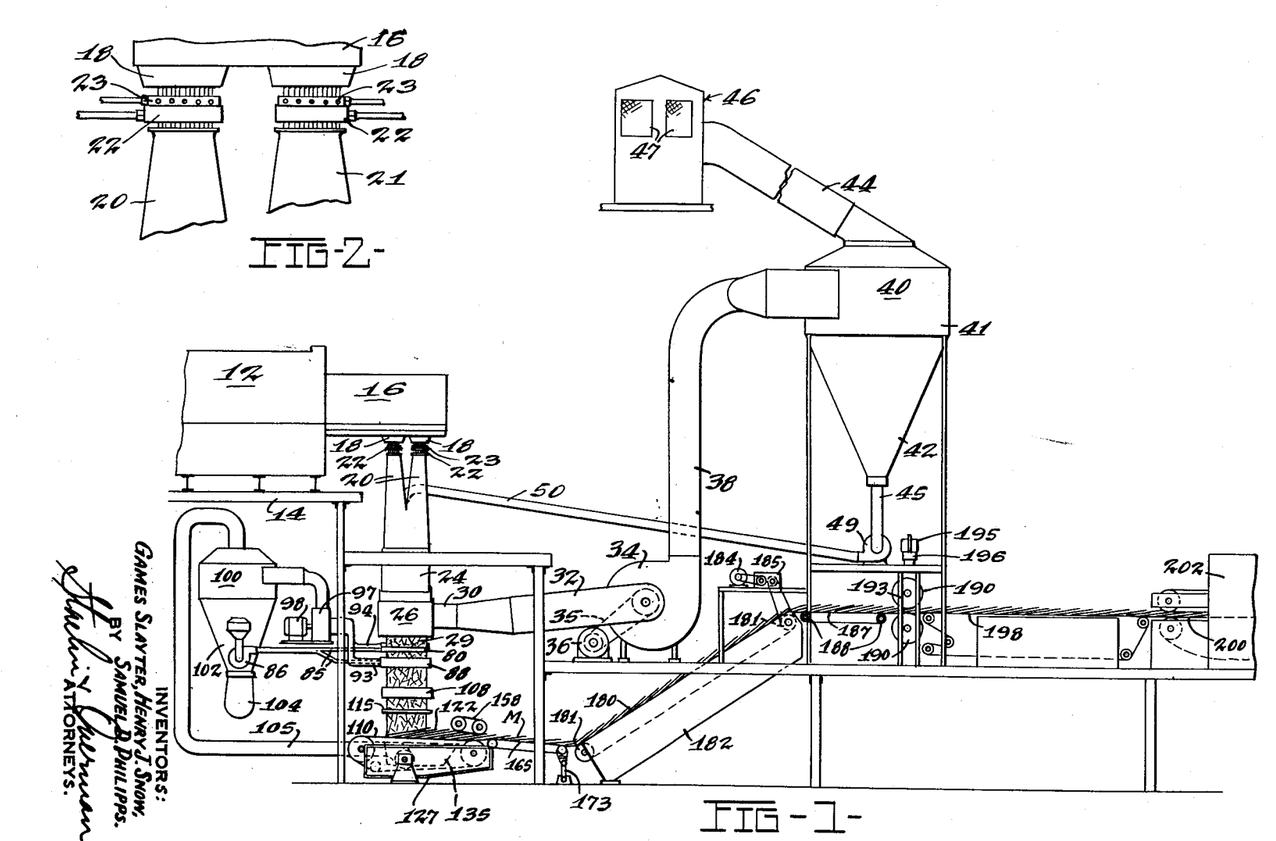
Figure 1 is a semidiagrammatic elevational view showing one form of apparatus for carrying out the method of producing fibrous mats.
Figure 2 is an enlarged end view of a portion of the apparatus of Figure 1 showing the fiber attenuating blowers and means for applying lubricant to the fibers as they are formed.

Referring to the drawings in detail and initially to Figures 1 through 11, the form of apparatus illustrated therein is preferably disposed within a suitable enclosure or building (not shown). Disposed in an elevated position as viewed in Figure 1 is a melting furnace 12 mounted upon a frame 14 and which is provided with a forehearth 16, the later being equipped with feeders 18, there being four present in the illustrated embodiment of the invention. The feeders 18 are spaced as shown in Figures 1 and 2 and each is formed with a plurality of orifices adapted to flow two groups of streams of the molten fiber forming material contained in the forehearth, the latter being supplied with material from the furnace 12.

Disposed beneath the feeders 18 are pairs of forming hoods 20 and 21 into which the groups of streams are respectively directed. Positioned adjacent the upper ends of each of the forming hoods are blowers 22 adapted to direct blasts of gas downwardly into the forming hoods and into engagement with the streams of fiber forming material which are attenuated by the velocity of the blasts into comparatively fine fibers which are conveyed downwardly through the attenuating zone or chamber defined by the walls of the forming hoods. A gaseous blast such as compressed air or steam under pressure has been found satisfactory for fiber attenuation for such materials as molten glass, slag or fusible rock.

It is desirable to apply a lubricant or sizing to the newly formed fibers to minimize interabrasion and this may be accomplished advantageously at the time the fibers are formed. For this purpose a plurality of lubricant conveying ducts 23 may be disposed adjacent the blowers 22 provided with outlets for discharging lubricant into the forming hoods 20 and 21 onto the fibers.

The attenuated fibers entrained in the gaseous blasts are moved downwardly through a chamber 24 forming a part of the fiber attenuating zone. Disposed beneath the fiber forming hoods and chamber 24 is a fiber collecting means including movable surfaces in the form of a pair of cylindrically-shaped drums or members 26 and 27 provided with circumferential foraminous surfaces forming collecting zones upon which the fibers are deposited from the forming hoods 20 and 21. In the arrangement of the invention as shown in Figures 1, 3, 4, 7 and 8 of the drawings, the fibers from forming hoods entrained in the streams of attenuating gases are directed onto the drums to form individual, comparatively thin layers or webs 28 of fibers, one on each drum. The drums 26 and 27 are journalled on parallel axes and adapted for rotation in opposite directions whereby the layers 28 of fibers collected on each drum are moved thereby into contiguous relation to form a double layer veil or fibrous strip 29 which is continuously formed and discharged from the median zone between the drums.

The arrangement is inclusive of the establishement of a reduced pressure or suction zone within the drums effective to facilitate the deposition and collection of the fibers upon the foraminous surfaces of the drums 26 and 27 and to convey or carry away the spent gas such as steam or compressed air discharged from the blowers 22 for attenuating the streams to fibers. To this end a pair of ducts 30 and 31 are disposed adjacent juxtaposed ends of the drums which are Siamese coupled or merged into a single duct 32, the latter connected to a blower 34 preferably of the sirocco type, driven through a driving means or belt 35 actuated by an electrically energized motor 36.

The exit or outlet of the blower is connected with a vertically disposed duct 38 through which air and the spent gases of attenuation are conveyed upwardly, thence laterally and are discharged into a receptacle or cyclone 40 in a tangential direction, the receptacle being formed with a cylindrical portion 41 and an inverted conically-shaped portion 42 providing a centrifugal type separator or cyclone effective to separate fibers from the air stream that may have entered the apertures in the foraminous surfaces of the collecting drums. The cyclone 40 is provided with a vent duct 44 for conveying the spent gas and air entering the drums into a chamber 46 having screened windows or openings 47 through which the gases from the receptacle 40 are discharged.

Figure 7:
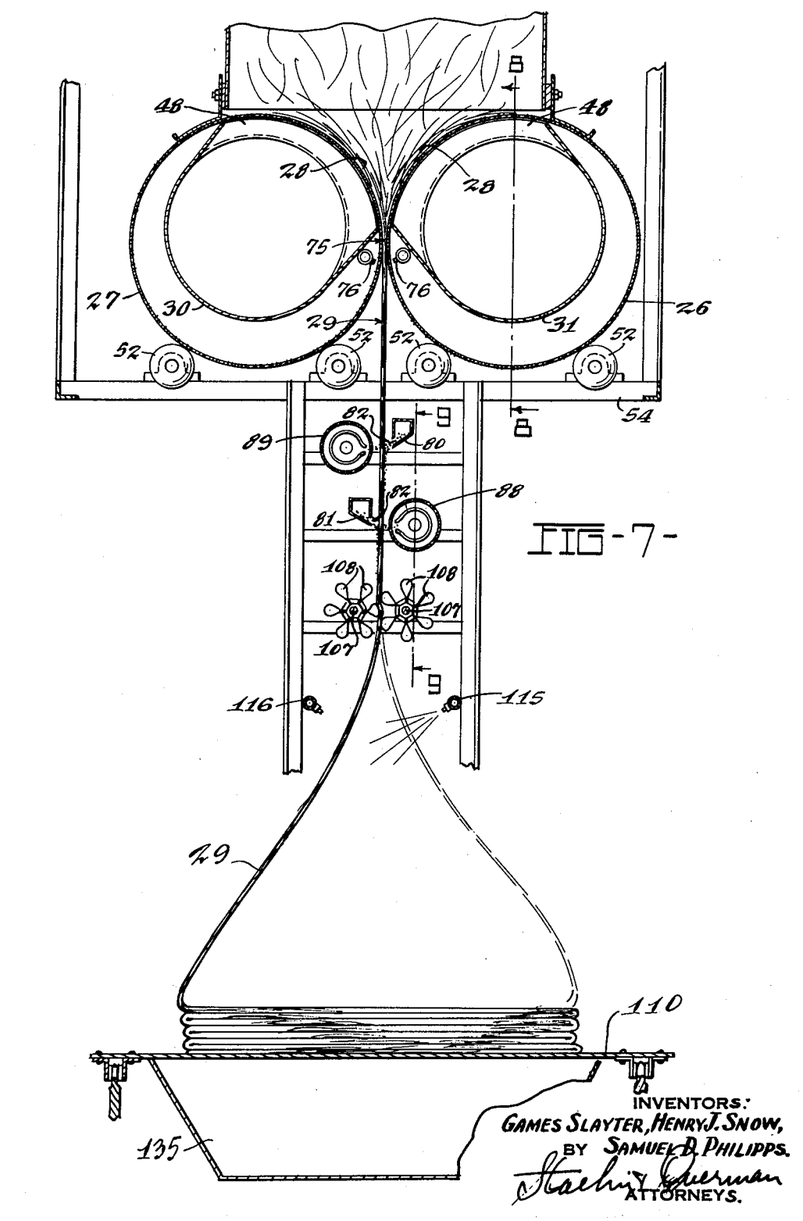
Figure 7 is a vertical sectional view taken substantially on the line 7—7 of Figure 5.
Figure 8:
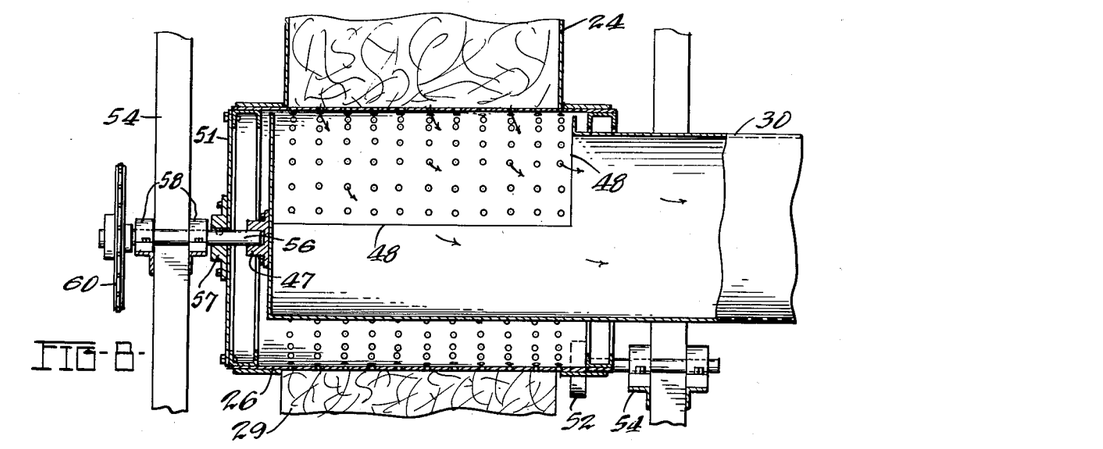
Figure 8 is a vertical sectional view taken substantially on the line 8—8 of Figure 7.

As will be seen in Figures 7 and 8, the ducts 30 and 31 project into the drums 26 and 27 substantially the full length thereof and are supported by journal blocks 47 respectively supported upon shafts 56 upon which the drums are journalled. The ducts are offset with respect to the axes of rotation of the drums in a direction of the fiber deposition zones so as to render the zone of reduced pressure or suction effective at the sectors of the drums upon which the fibers are collected. The walls of the ducts within the drums are provided with rectangular openings indicated at 48 so that the zone of reduced pressure or suction is effective only throughout that part of the circumference of the drums upon which the fibers are collected.

Provision is made for returning the fugitive fibers entrapped in the conically-shaped portion 42 of the fiber separating cyclone 40. To this end, a duct 45 connected to the apex of portion 42 is in communication with a small suction device or blower 49 adapted to establish an air stream for conveying the collected fibers in the portion 42 through a tube 50 which returns the fibers into the chamber 24 above the drums where such fibers are again deposited in layer formation on the drums concomitantly with the deposition of newly attenuated fibers from the forming hoods. Through this arrangement, substantially all of the fibers are utilized in forming the end product.

Figure 4:
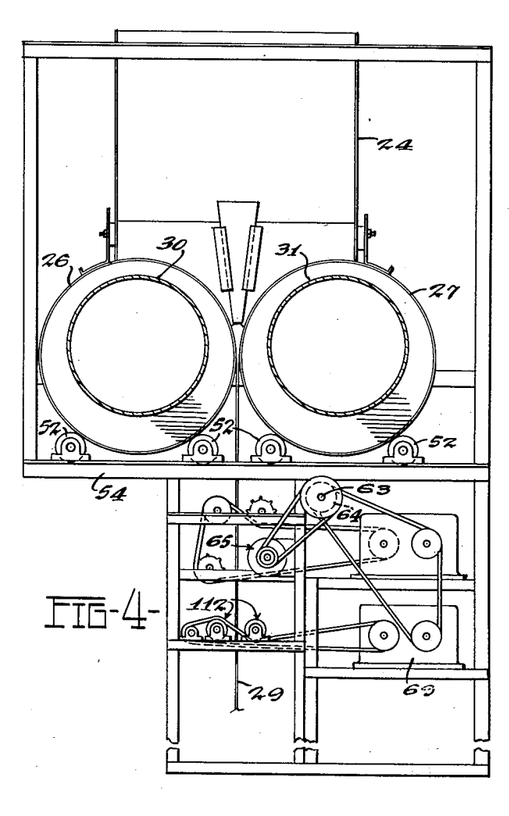
Figure 4 is an end view of the fiber collecting drums and driving means for elements of the binder applying apparatus.

The ends of the drums opposite those in registration with the exhaust ducts 30 and 31 are closed by baffle plates 51. Each of the drums is supported at one end by means of pairs of supporting rollers 52 journalled upon frame members 54, the rollers being spaced as shown in Figures 4 and 7 to render the drums stable during rotation. The other end of each drum is provided with a shaft 56 secured to a hub 57 on the baffle plate 51, the shafts being journalled in bearings 58 and carrying sprockets 60 connected by a chain 61 with a driving sprocket 62 mounted on a shaft 63. The other end of the shaft 63 is provided with a sprocket 64 driven from a motor 65 for rotating the drums.

Figure 3:
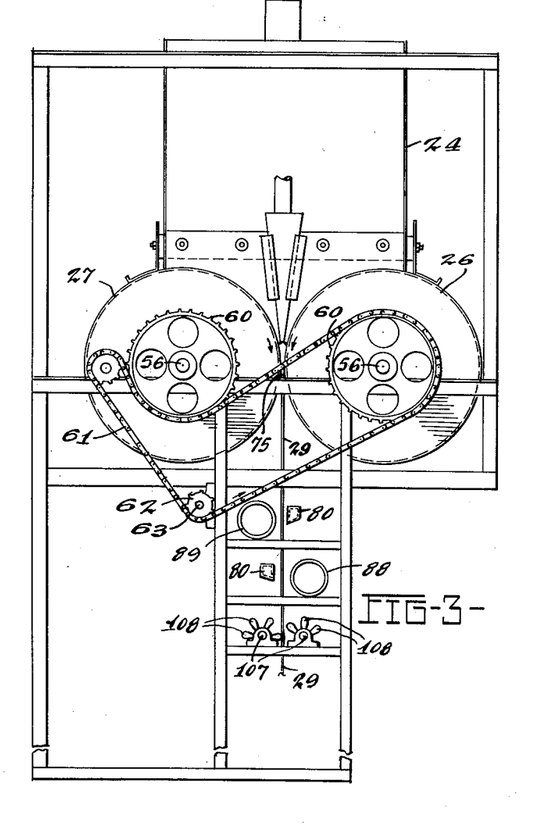
Figure 3 is a side elevational view illustrating the fiber collecting and binder applying means.

As shown in Figure 3, the chain 61 and sprocket arrangement is such that the drums are concomitantly rotated in opposite directions as indicated by the arrows so as to carry or move the relatively thin layer or web 28 of collected fibers on each drum into contiguous relation at the median zone 75 between the drums.

The thin layers or webs of fibers, having been wetted by the lubricant and the condensation from the steam blasts utilized for fiber attenuations, tend to cling or adhere together as a dual layer or veil 29. In order to assure discharge of the veil 29 from the drums, a plurality of nozzles 76 shown in Figure 7 may be disposed at each side of the veil below the zone 75 adapted to eject air under pressure with sufficient force to prevent the fibers from adhering to the drums and strip the veil therefrom.

Means are provided for applying or impregnating the dual layer fibrous web or veil 29 with a bonding material or binder of a character which may be heat cured or otherwise set to impart mass integrity to the mat or end product. While a binder in liquid form may be utilized for impregnating the veil either as it emerges from the drums or in subsequent lapped or laminar pack formation, it is preferred to utilize a dry binder in comminuted or powdered form as several distinct advantages accrue through the use of such a binder especially with a veil or web of comparatively thin character. When a wet binder or one in aqueous suspension is utilized, subsequently heat in large amounts must be applied in curing the binder in order to drive off or volatilize the liquid constituent.

The present invention embodies an arrangement whereby dry or comminuted binder may be uniformly distributed through the veil or web and any excess binder returned for reuse. As will be apparent from the drawings, the veil 29 moves downwardly in a substantially vertical plane. Arranged at each side of the veil and preferably one above the other are binder dispensers or applicators in the form of elongated tapered troughs 80 and 81; each of the troughs is formed with an elongated slot or opening 82 through which the powdered binder is discharged.

A binder feeding means is provided and includes a supply hopper or receptacle 83 associated with a material metering and feeding mechanism 84 preferably of the electrically energized vibrator type adapted to deliver binding material continuously to the troughs 80 and 81 through the tubes 85. Any suitable propelling means may be utilized, as for example, a blower 86 for establishing an air flow through the tubes 85 entraining the binder and conveying same into the troughs 80 and 81.

Disposed respectively opposite the troughs are cylindrical rolls or drums 88 and 89 journally supported upon shafts 90 carried in suitable bearings, the rolls 88 and 89 having peripheral foraminous surfaces. Disposed respectively within the rolls are stationary ducts 93 and 94 which are connected with a suction device or blower 97 driven by a motor 98 for establishing subatmospheric pressures adjacent the veil and opposite each binder dispensing trough, the suction or air movement being effective to carry the powdered binding material into the veil.

The excess binder which is carried through the veils enters the tubes 93 and 94 and is conveyed into a receptacle or cyclone 100 of the general shape and character of the cyclone 40 but of reduced size. Due to the whirling or turbulent action of the powder laden air in the cyclone 100, the particles of binder are discharged downward into the cone-shaped portion 102 and are collected in a bag or receptacle 104 situated at the apex of the cyclone. The receptacle 104 may be removed periodically from the cyclone and the retrieved binder returned to the hopper 83 for reuse. The cyclone 100 is provided with a vent duct 105 connected with a suction chamber 135 disposed beneath a conveyor 110.

A powdered binder that has been satisfactory in the above described arrangement consists of a combination of Vinsol and phenol formaldehyde in the "B" stage. Vinsol is a thermoplastic resin separated as one fraction from the resinous material obtained by solvent extraction or steam distillation of Southern pine while phenol formaldehyde is a thermosetting resin, the mixture of these constituents in the mat when cured imparting a high degree of mass integrity with a minimum amount of binder required. Furthermore the heat energy required to cure or set the binder is much less than heretofore required and hence the impregnated mat may be conveyed through the curing zone at increased speed to obtain higher production at decreased cost.

Other materials in powder or comminuted form may be utilized such as melamine, polyester or powdered rosin. It is to be understood that binders or adhesives may be applied in liquid or aqueous suspensions or solutions by spraying the same onto the veil in lieu of the powdered material.

Figure 9:
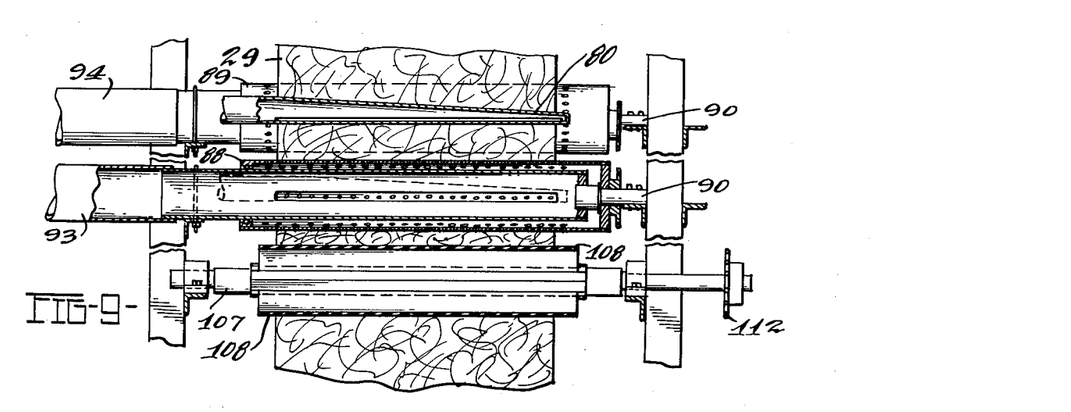
Figure 9 is a vertical sectional view taken substantially on the line 9—9 of Figure 7.

The binder impregnated veil 29 moves downwardly into engagement with a means for vibrating or agitating the veil to further distribute the binder more uniformly or homogeneously therethrough. One form of agitating means is best illustrated in Figures 7 and 9 and includes a pair of spaced parallel shafts 107, each supporting a veil engaging element preferably of a flexible character. The veil engaging elements 108 may each be formed of a sheet of elastomer such as rubber, synthetic rubber or the like configurated or supported to form a plurality of radially extending folds or loops which during rotation of the shafts 107 contact both major faces of the veil, agitating or whipping the same to effect uniform distribution of the binder and to facilitate movement of the binder to the interior of the veil.

The shafts 107 and the elements 108 carried thereby are driven from a speed controlling or changing mechanism contained in the housing 69 through a chain and sprocket drive mechanism 112 as shown in Figure 4. The elements 108 additionally function to exert a pull or tension on the veil and provide an anchor or fulcrum for the veil as it is alternately moved in transverse directions during the folding or lapping of the same.

The binder impregnated veil thereafter continues its downward vertical movement and is adapted to be deposited upon a suitable surface in a manner whereby the veil is folded or lapped upon itself to form a fibrous laminar pack. The apparatus is inclusive of means for causing lateral bodily movement of the veil, the extent of the lateral movement being substantially the width of the mat to be formed.

The downwardly moving veil is collected upon a relatively movable surface including a flexible conveyor 110, the upper flight of which is adapted to receive the veil folded or lapped upon itself. The means illustrated for causing the vertically and downwardly moving veil to be folded upon itself utilizes blasts of air alternately emanating from nozzles disposed at each side of the moving veil and arranged to effectively cause an undulating or swinging movement thereof to facilitate collecting the veil in multilayer or laminar pack formation.

Figures 5, 6:
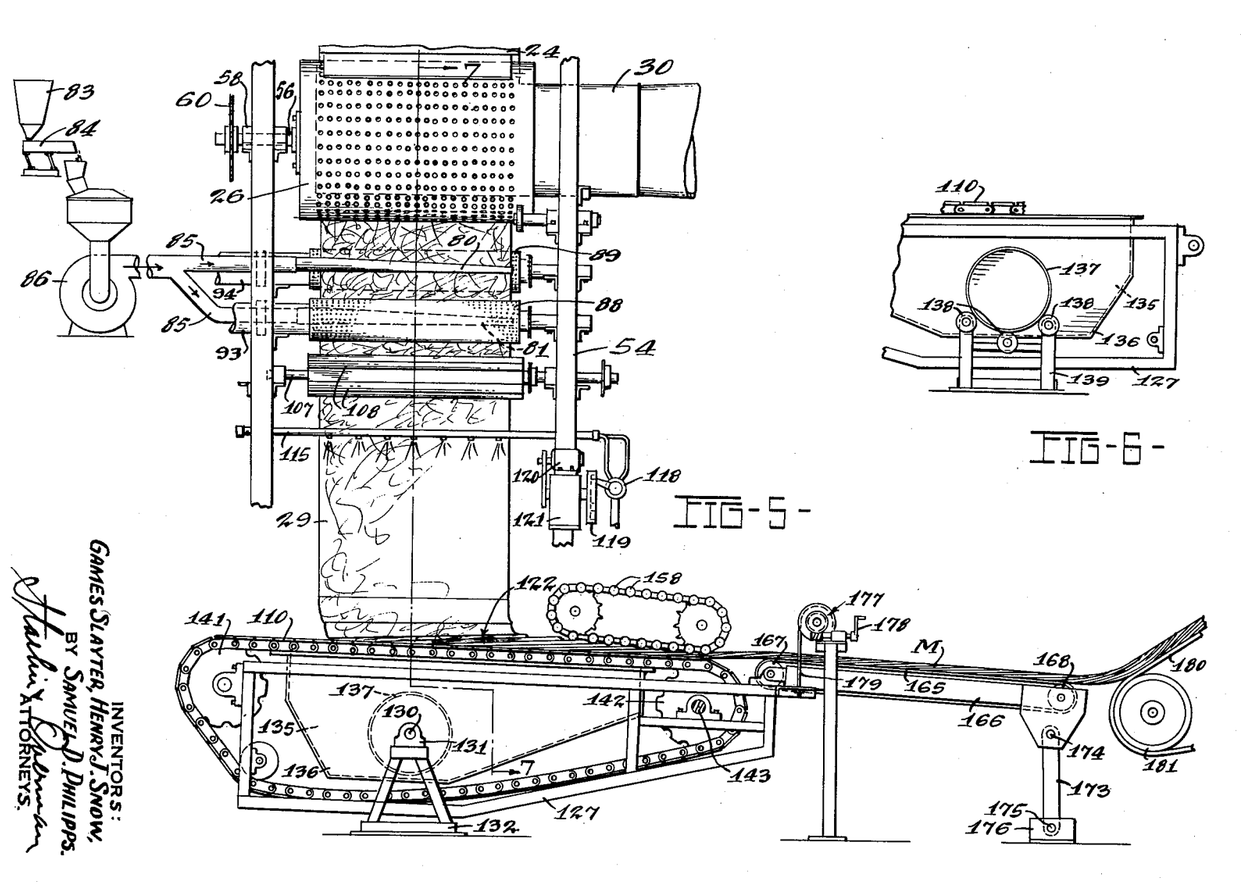
Figure 5 is a side elevational view of the binder applying apparatus and the laminar pack supporting conveyor and associated mechanism.
Figure 6 is a fragmentary view of a portion of the opposite side of the pack supporting conveyor.

As particularly shown in Figures 5 and 7, manifolds or pipes 115 and 116 are respectively disposed at opposite sides of the veil and are connected with a source of gas under pressure, as for example, compressed air, each manifold being provided with one or more nozzles for intermittently directing blasts against the veil. The pressure air delivered through the nozzles may be controlled by an automatically operated valve means 118 operated by a cam 119 which is constantly rotated by a motor 120 through suitable variable speed reducing mechanism contained in a housing 121, the cam being rotated at a speed proportionate to the linear movement of the veil so that the air valve directs air to one manifold and then to the other to successively cause the veil to be folded upon itself as shown in Figures 5 and 7 to provide a laminar pack 122 with the laminations disposed in angular echelon formation. The extent of undulatory lateral movement of the veil determines the width of the multilayer mat construction.

Figure 17:
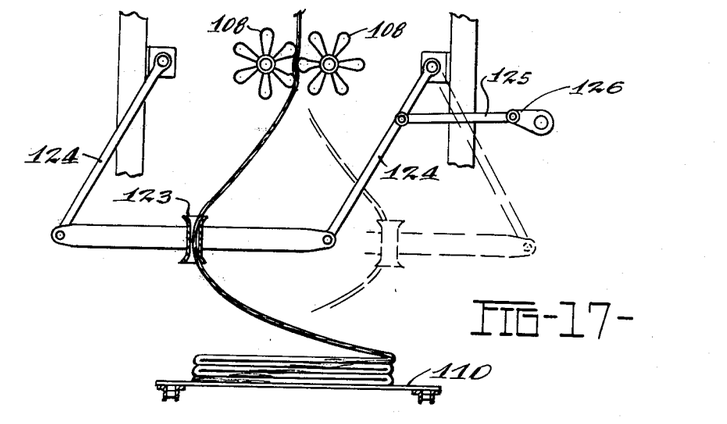
Figure 17 is a semidiagrammatic view illustrating another form of means for folding or lapping the veil in laminar pack configuration.

It is to be understood that the veil may be undulated by mechanical means or other mechanism adaptable to cause the veil to be lapped or folded upon itself. One form of means of this character is shown in Figure 17 and includes a traversing horn or guide member 123 supported by pivoted links 124 reciprocated by a pitman 125 and crank 126 actuated by a motor (not shown) or other driving mechanism. In this arrangement the veil depends through the horn 123 and is caused to be folded upon itself upon the conveyor 110 by lateral reciprocatory movements of the horn.

The conveyor 110, forming a surface upon which the veil is built up into pack formation, is mounted upon a frame 127 comprising side sections 128 joined together by transversely extending members. The frame 127 is provided at one side with a stub shaft 130 journalled in a bearing 131 mounted upon a relatively stationary support or frame structure 132 mounted upon the floor or other supporting surface. The axis of the shaft 130 forms a pivotal axis about which the conveyor frame structure 127, the conveyor arrangement 110 and mechanism associated therewith may be adjusted to obtain a particular angular position of the conveyor surface to accommodate the progressively thickening laminar pack during the deposition of successive folds of the veil upon the conveyor.

The conveyor 110 is of the foraminous type and disposed beneath the upper flight of the conveyor is a chamber 135 formed of sheet metal plates supported upon the frame 127, the chamber being provided with a cylindrical duct or tube 137 connected with a suction producing device or blower (not shown) for establishing a subatmospheric or reduced pressure zone to facilitate the deposition of the veil upon the conveyor and is especially effective in holding the successive folds in their proper assembled relationship during formation of the pack.

Figures 10, 11:
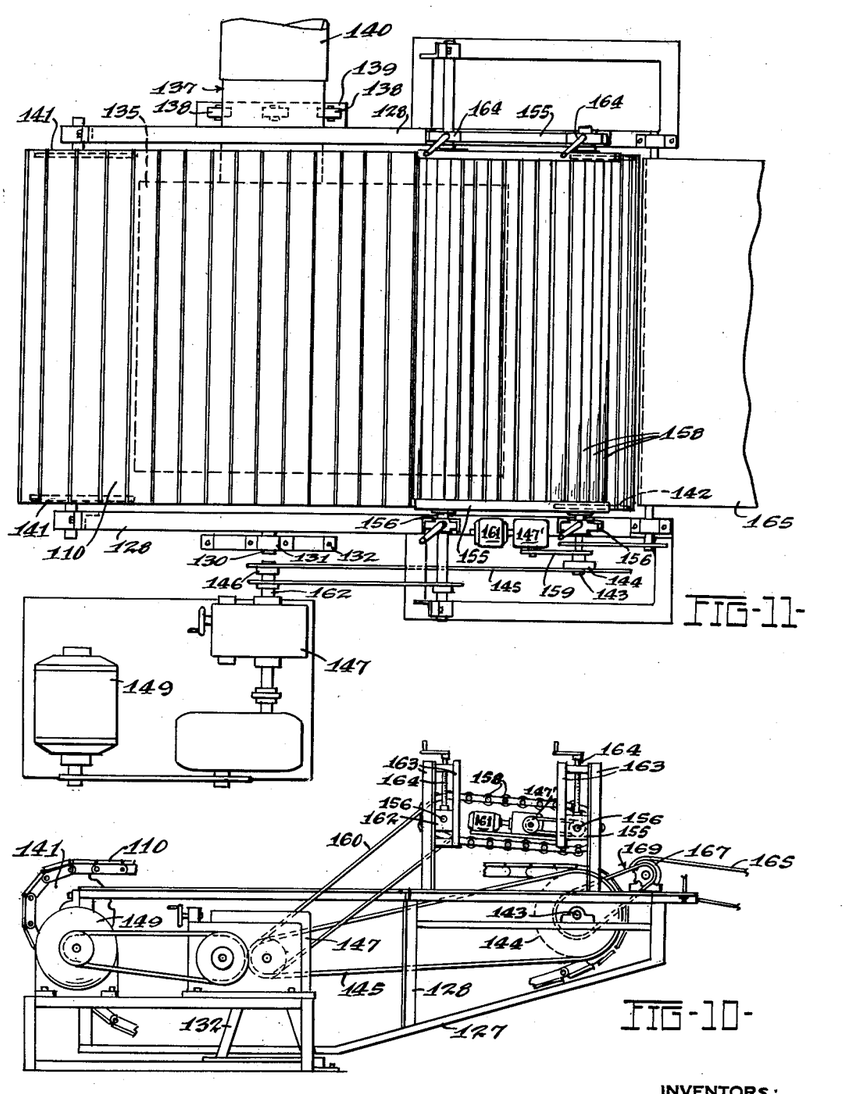
Figure 10 is a side elevational view of the laminar pack supporting conveyor and felting rolls.
Figure 11 is a top plan view of the apparatus illustrated in Figure 10.

The portion of the duct 137 directly connected to the chamber wall is of rigid formation and is axially aligned with the stub shaft 130 and is supported upon rollers 138 journalled in bearings carried by a relatively stationary frame 139 as shown in Figure 6. This arrangement provides for concurrent movement of the chamber with the conveyor 110 when the latter is adjusted about the axis of the shaft 130. The portion 140 of the duct 137 shown in Figure 11 is of a flexible construction to facilitate relative movement of the chamber 135.

The conveyor 110 is mounted upon suitable sprockets or carriers 141 and 142, the shaft 143 supporting the carrier 142 being provided with a sprocket 144 connected by a chain 145 with a sprocket 146, the latter in turn being driven from a speed reducing gear of adjustable character contained within a housing 147, the gearing being actuated by a motor 149 through a conventional drive arrangement.

Disposed above the upper flight of the conveyor and rearwardly of the zone of actual deposition of the veil of fibers upon the conveyor is a means for compacting or felting the several folds or layers of the laminar pack after the same move away from the veil collection zone. This compacting arrangement is inclusive of a frame structure 155 upon which are journalled spaced shafts 156 carrying an endless belt-like assembly of compacting or felting rolls 158.

One of the shafts 156 is equipped with a sprocket driven by the gearing of a variable speed reducer contained in housing 147' by a motor 161. Through the use of variable speed mechanism, the laminar pack felting rolls 158 may be driven at a linear speed coordinated with the linear travel of the conveyor 110. The frame 155 carrying the felting rolls 158 is supported for adjustment relative to the conveyor 110 to control the extent of felting or compacting of the laminations. As illustrated in Figure 10, such means may comprise bearing blocks 162 arranged for vertical slidable adjustment in frames or ways 163 by manipulation of the adjusting members 164.

The linear rate of travel of the felting rolls is preferably adjusted to a speed slightly greater than the linear or surface speed of the conveyor 110 to aid in compacting or folding in the upper edge portions of the laminations in forming a mat M from the laminar pack 122.

The frame 127 supporting the conveyor means 110 and the felting assembly is pivotally adjustable about the axis of the shaft 129 for the purpose of regulating the angular position of the upper flight of the conveyor. As illustrated in Figure 5, one form of adjusting means includes gearing 177 operated by a crank 178, the gearing being arranged to actuate a cable 179 connected to one end of the frame 127 for shifting the relative angular position of the conveyor 110.

It will be noted from Figure 5 that as the veil is folded in directions transversely of the conveyor 110 and as the conveyor moves in a righthand direction, the successive folds or thicknesses of the veil are stacked in echelon and are angularly disposed with respect to the plane of the conveyor 110. Thus it is necessary to adjust the conveyor 110 at a proper angle so that the folds or layers of the mat are disposed in a more nearly horizontal position so as to facilitate the assembly of the laminations and the felting or compacting operation.

The multilayered or laminar mat of fibers emerging from the compacting rolls 158 is projected onto a conveyor section 165 supported upon a frame 166. Journally mounted at the ends of the frame 166 are rollers 167 and 168 supporting the conveyor 165 which is driven by chain and sprocket means 169 from the shaft 143. Through the interconnected driving arrangement, the conveyor section 165 may be moved at the same rate of linear travel as the conveyor 110.

The frame 166 adjacent the roller 168 is articulately supported so as to accommodate angular adjustment of the conveyor 110. As illustrated in Figure 5, a strut or link 173 is pivotally connected to the frame 166 by means of a shaft 174, the lower end of link being pivotally connected as at 175 with a stationary member or support 176. Thus the angularity of the conveyors 110 and 165 may be changed but the fibrous pack or mat carried by the conveyors will be delivered from the righthand end of the conveyor 165 at substantially the same height above the floor.

The multilayer or laminar mat of fibers is discharged by conveyor 165 onto the upper flight of a movable conveyor section 180 mounted upon rollers 181 journalled upon a supporting frame 182. The conveyor 180 may be angularly disposed forming a ramp for elevating the mat for traverse to additional processing stations. The conveyor 180 may be driven by a motor 184 through a variable speed reducing mechanism 185 which in turn is operatively connected with one of the conveyor supporting rollers 181. The speed reducing mechanism 185 enables accurate control of the speed of the conveyor 180.

The mat M is discharged at the upper end of the conveyor 180 onto a belt-like platform 187 mounted upon rollers 188 which directs the mat between a pair of crushing rolls 190. The rolls 190 serve to break the fibers to reduce the resiliency of the mat and condition the fibers for the binder curing operation. The rolls 190 may be supported upon a frame 193 for adjustment in a vertical direction and are driven by a motor 195 through a suitable speed reducing mechanism 196 of conventional character.

The compacted laminae of fibers in mat formation are discharged from the rolls 190 onto the upper flight of a conveyor section 198 which is driven at the desired speed by suitable means (not shown). The conveyor 198 delivers the mat construction onto a conveyor 200 which carries the mat through a curing zone or oven 202 at which zone heat is applied and the temperature of the oven maintained to set or cure the resin component or binding agent in the mat construction. The cured mat may thereafter be conveyed to suitable cutting devices for severing the same into desired lengths or sizes.

Figure 12:
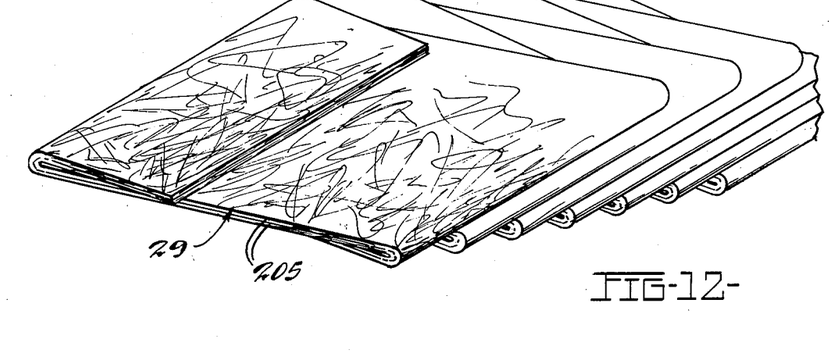
Figure 12 is an isometric view illustrating the orientation of the laminations in the pack.
Figure 13:
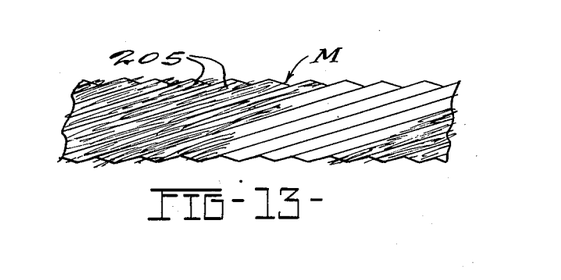
Figure 13 is a longitudinal sectional view through a section of formed mat produced by the apparatus illustrated in Figure 1.

Figure 12 illustrates the angular echelon formation of the laminations or layers 205 of the veil 29 providing a laminar pack arrangement as they are collected upon the conveyor 110. Figure 13 is illustrative of a section of the completed mat M showing the angular orientation of the individual laminations 205 with respect to the major faces or surfaces of the mat. The angular positioning of the laminations eliminates the projection of individual fibers from one surface to the other in directions substantially normal to the mat surfaces so that the insulating characteristics of the mat are greatly improved. While the surface fibers of the individual juxtapositioned laminations are in a measure felted by the felting rolls 158 and the sizing rolls 190, the individual fibers of one lamination do not project through adjacent laminations.

The operation of the hereinbefore described apparatus in carrying out the method of the invention is as follows:

Molten or flowable fiber forming material, as for example glass, which has been melted in the furnace 12 flows to the forehearth 16 and is continuously discharged in a plurality of fine streams through the openings in the feeders 18. Concomitantly lubricant is discharged from the manifolds 23 into the forming hoods for lubricating the fibers and blasts of steam or other gas under pressure discharged from the blowers 22 are directed into the forming hoods or chambers 20 and 21 in the general direction of the flow of the glass streams engaging and attenuating them to fine fibers which travel downwardly through the forming hoods and are deposited in comparatively thin layers or webs upon the foraminous surfaces of the rotating drums 26 and 27. The suction or reduced pressure within the drums set up by the blower 34 facilitates the deposition of the fibers in substantially uniform layers and further serves to hold the fibers to the surfaces of the drums throughout a partial rotation thereof. The suction apparatus also carries away the spent steam and air which enters the forming hoods above the blowers 18. The fibers are formed and collected at a rate to form the thin web or veil which offers little resistance to the flow of air through the perforations in the drum; hence, there is a tendency for some of the fibers to be sucked through the perforations into the air stream and be conveyed through the duct 38 to the cyclone type separator 40. The rotation of the gases in the cyclone effects a separation of the fugitive fibers which are thrown out of the air stream and gravitate into the apex of the cyclone and are entrained in an air stream developed by a small blower 49 which returns such fibers through the duct 50 to the forming hoods for redeposition upon the collecting drums. By this means fibers that might otherwise be lost are retrieved and eventually incorporated into the mat construction. Any fibers which may remain in the air stream in the cyclone 40 are conveyed to and entrapped in the screened chamber 46.

The comparatively fine webs of fibers collected upon the drums are moved by the drums into contiguous or parallel relation to form a dual layered web or veil of comparatively thin character. The veil 29 moves downwardly in a vertical path through the binder applying station where binder is projected into the veil from the applicators 80 and 81. The interiors of the foraminous cylindrical members 88 and 89 are under a subatmospheric or reduced pressure which facilitates movement of the powdered binder through the veil from each side thereof.

The excess binding agent which passes through the veil is conveyed through ducts 93, 94 by an air stream produced by blower 97 into a cyclone or separator 100 where the powdered binder is separated from the air stream and collects in the receptacle 104 disposed at the lower end of the cyclone.

The powder impregnated veil is continuously moved into engagement with the agitating or vibrating means 108 which agitates the veil to more uniformly distribute the powdered binder therethrough. As the veil moves away from the agitator 108 a means or force is effective to undulate or swing the veil in a to-and-fro movement, the agitating means serving as a fulcrum or anchor about which the veil swings in its transverse reciprocatory movement. The air jets 115 and 116 direct blasts of air periodically in alternate directions to cause the undulating movement of the veil. The veil is collected upon the moving conveyor 110, the speed of which is coordinated with the linear rate of movement of the veil and the extent of the undulation or swing whereby the veil is folded upon itself in multilayer pack formation shown in Figure 12. The laminar pack 122 is conveyed beneath the ironing or felting rolls 158, the compressed pack or mat of fiber layers thereafter being conveyed successively by conveyors 165, 180 and the movable platform 187 to the crushing rolls 190. The mat is conveyed by conveyor 198 to the binder curing oven or zone 202 where the application of heat effectively sets or cures the binder to impart mass integrity to the mat. The method of applying the binder to the relatively thin veil or web provides a substantially homogeneous disposition of the binder throughout the mat so that there are no zones or areas of concentration or excesses of binder.

The utilization of a powdered or comminuted binder secures certain advantages and economies over prior methods of binder application as the absence of an aqueous suspension or solution effects a substantial saving in the amount of heat required to cure the binder as there is an inappreciable amount of water to be volatilized and driven off in the preferred method of utilizing powdered binder. Another advantage flowing from the use of powdered binder resides in the application of the binder outside of the forming hoods and steam distillation of the binder is thus avoided.

The method is however readily adaptable to the utilization of binders in aqueous solutions or suspensions as the binder may be sprayed onto the veil or web during its vertical movement at substantially the same zone that the powdered binder is applied. When such resin solutions or suspensions are employed, the resins may have a lower aqueous dilutability and relatively high solids content. For example, a resin such as phenolformaldehyde in the "B" stage with water as a carrier may be sprayed onto the veil and good distribution obtained because of the thinness of the the veil. The decrease in the amount of water used enables the use of a curing oven of reduced size as less heat is required in the curing zone.

The product produced by the form of the invention hereinbefore described is shown in Figure 13. The method of folding the veil or web upon itself transversely of the direction of movement of the conveyor upon which the veil is deposited establishes the folds at the transverse edges of the pack or mass. After the mat of fibers has passed through the crushing or sizing rolls 190 and has passed through the curing oven or zone, the edges may be trimmed or sheared by means (not shown) which removes the bight portions of the folds providing a mat having smooth, neat appearing edges. It is to be understood that the mat may be cut or severed by well-known conventional means into any desired shape or size depending upon its installation or the purpose for which it is used.

Figures 14, 15:
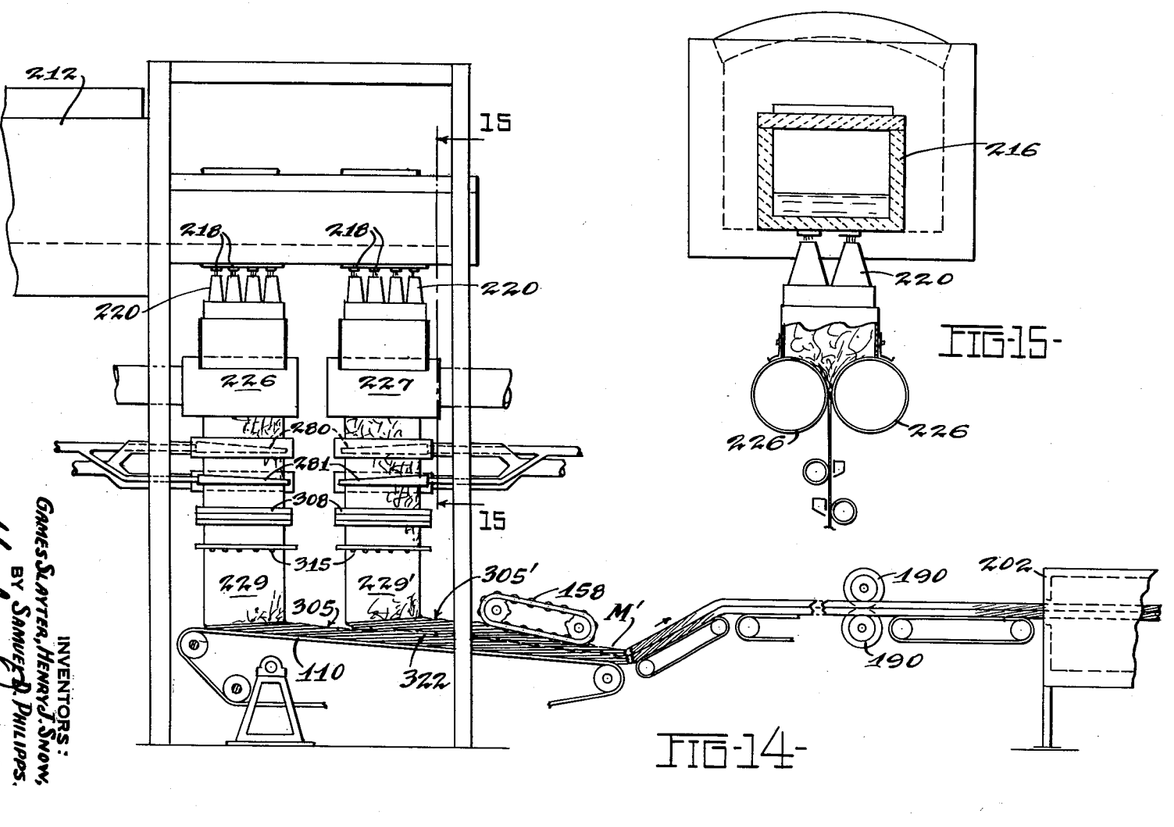
Figure 14 is a semidiagrammatic elevational view illustrating a modified form of apparatus for concomitantly forming a plurality of layers or veils and assembling them into a laminar multi-tier pack.
Figure 15 is a sectional view of a portion of the apparatus shown in Figure 14, the section being taken substantially on line 15—15 of Figure 14.

Figures 14 and 15 illustrate in semidiagrammatic form a modification of an apparatus for carrying out the method of the invention. This modification is directed to the method of forming dual webs or veils and depositing them concomitantly to form a laminar mat or product. The melting tank or receptacle 212 is provided with a forehearth 216 provided with groups of feeds 218 from which flow groups of streams of glass or other fiber forming material. Disposed beneath the groups of feeders are forming hoods or chambers 220 in which the streams are attenuated to fibers by engagement of blasts of steam or air emanating from blowers disposed at the upper ends of the forming hoods.

Disposed beneath the groups of forming hoods are dual pairs of drums 226 and 227 having foraminous surfaces upon which the fibers are deposited in thin layers or webs, one on each drum. The drums are of substantially the same construction as those described in connection with the form of the invention shown in Figure 1.

The layers or webs of fibers formed on the respective pairs of drums when brought into contiguous relation form independent veils or dual layers of fibers 229 and 229', a binding agent being applied to each veil in the same manner as hereinbefore described by means of pairs of binder dispensing troughs 280 and 281 and associated suction means for causing the powdered binder to be moved through the veils. Disposed beneath the binder applying zones of each veil or fibrous layer is a pair of corrugated membes 308 preferably formed of loops of resilient or elastomeric material such as sheet rubber which serves to agitate or vibrate the veils for securing effective distribution of the binder therein and to form a fulcrum or anchor from which the veils may be undulated by air jets 315 disposed at opposite sides of the veils.

The blasts of air from the jets or nozzles 315 cause a concomitant desposition of both veils or layers upon the conveyor 110, the veils being folded back and forth transversely of the longitudinally moving conveyor to form two superposed laminar packs, the laminations of each pack being angularly arranged with respect to the conveyor surface. This arrangement thus produced two tiers or strata 305 and 305' in superposed relation wherein the individual laminations of each tier extend angularly or diagonally relative to the major faces of the mat and through substantially one-half the thickness thereof. The mat or product M' formed by this method of assembly of a plurality of veils is illustrated in Figure 16.

Figure 16:
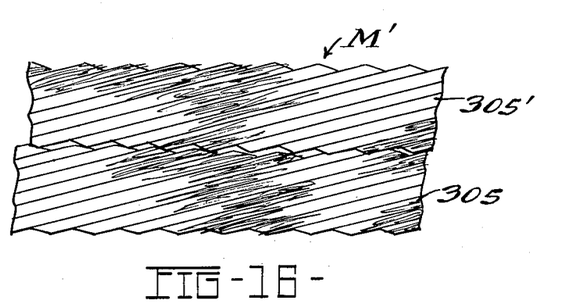
Figure 16 is a longitudinal sectional view through a section of formed mat produced by the apparatus shown in Figures 14 and 15.

The laminar pack 322 formed by two tiers of dual veils in lapped assembly is processed in the same manner and by the same apparatus shown in Figure 1 and hereinbefore described, the pack being moved beneath ironing or felting rolls 158 and through crushing or sizing rolls 190 and into a curing oven or zone 202 to produce the mat M' shown in Figure 16. It will be apparent that none of the fibers adjacent the major faces extend through the mat and hence the insulating value of the mat is thereby greatly improved. In carrying out this method, the apparatus perferably includes the adjuncts shown in Figure 1 such as the fiber recovering cyclone 40, the binder recovering cyclone 100 and the sequentially arranged conveyors 165, 180, 187 and 198 and associated elements and driving mechanism.

Figures 18, 19:
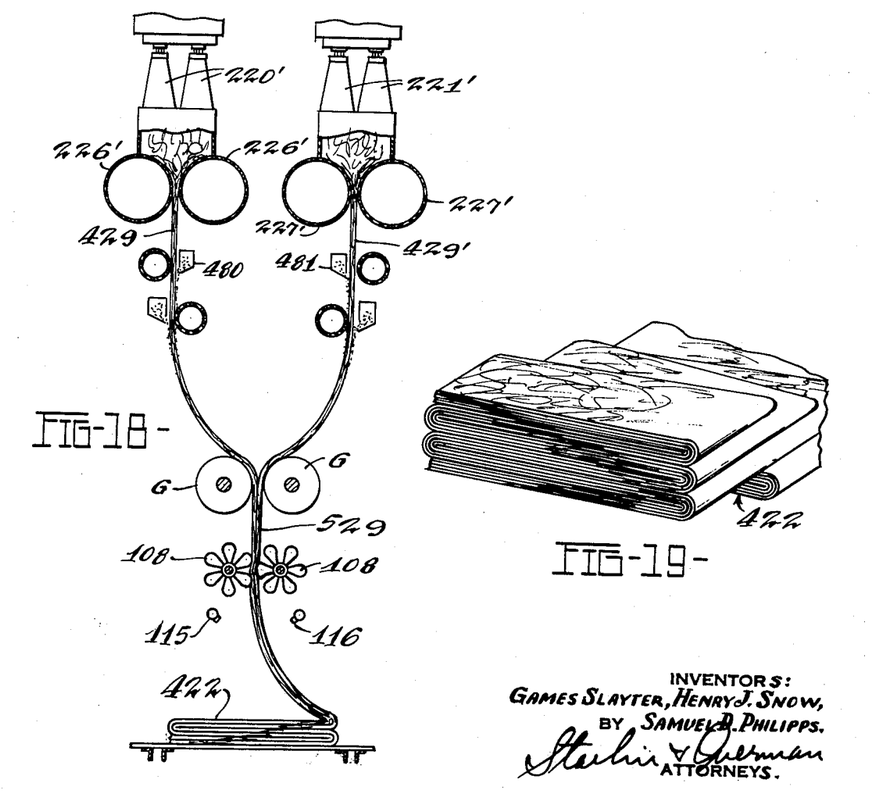
Figure 18 is a semidiagrammatic view illustrating a modified form of apparatus for producing a laminar mat of fibers.
Figure 19 is an isometric view illustrating the arrangement of laminations in the pack formed by the apparatus shown in Figure 18.

Figure 18 illustrates in semidiagrammatic form an apparatus for carrying out the method of the invention wherein two dual stratum veils 429 and 429' are brought into contiguous relation before they are assembled in a laminar pack or mat formation. In this form of apparatus, two pairs of drums 226' and 227' provide dual pairs of fiber collecting surfaces arranged to form thin webs or layers of fibers attenuated in forming hoods 220' and 221' disposed above the respective pairs of drums. The webs or layers of fibers of each pair of drums are moved in directions to concomitantly and continuously form two independent veils or webs 429 and 429', each of dual thickness by reason of the combining of the layers of fibers from each pair of drums.

The binder may be applied in the same manner as the form of the invention hereinbefore described, there being a binder applying means for each veil as illustrated at 480 and 481. The binder may be applied immediately beneath the pairs of fiber collecting drums 226' and 227', the veils being thereafter brought into contiguous relation by means of guide rolls G. The veils, when brought into contiguous engagement, form a quadruple layered or composite veil 529 which may be passed between corrugated rolls 108 of the same construction as those illustrated in the other forms of apparatus hereinbefore described. The corrugated members cause an agitation or vibration of the veils for attaining more uniform distribution of the binding agent through the multilayered veil as well as to provide a fulcrum or anchor from which the veil may be undulated in directions transversely of the conveyor upon which the veil is deposited under the influence of blasts of air emanating alternately from jets 115 and 116 forming a laminar pack.

The form of laminar pack 422 resulting from this method is illustrated in Figure 19 and the mat formed therefrom is endowed with substantially the same advantageous characteristics as the other forms of product disclosed. There are no fibers in the finished mat that extend continuously through the mat from one major face to the other in directions normal to the faces.

The laminar pack 422 formed by means of the apparatus shown in Figure 18 is processed into a mat in the same manner as hereinbefore described wherein the laminar pack is passed through felting rolls thence into a curing zone or oven and the mat or end product trimmed and cut to desired dimensions.

Figure 20:
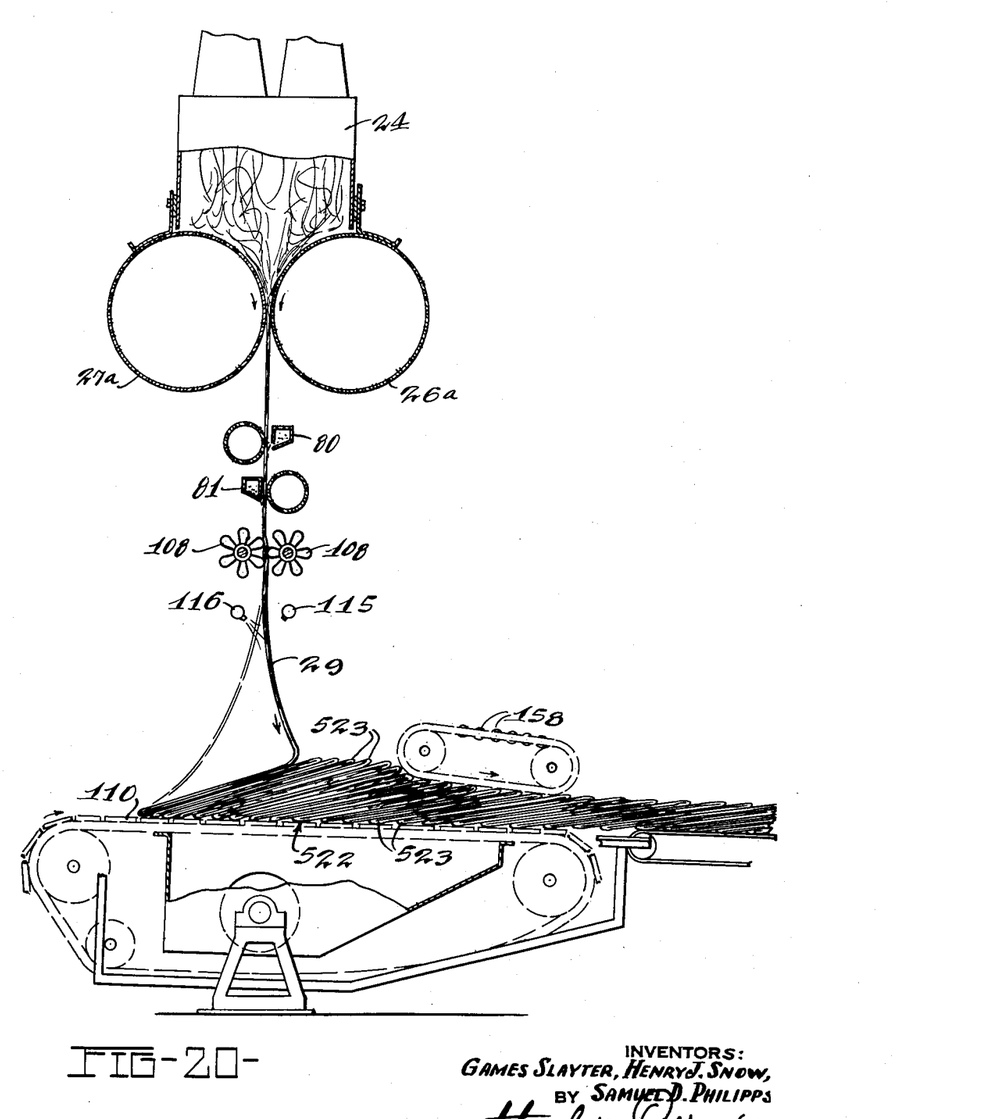
Figure 20 is a fragmentary view illustrating another mode of assembling the fibrous layer or veil into laminar pack formation.

Figure 20 illustrates an arrangement for lapping or folding the veil or web upon a collecting conveyor in directions longitudinal of the conveyor. In this form of construction for carrying out this purpose, the fiber collecting drums 26a and 27a are journalled about axes extending in parallelism and transversely of the collecting conveyor 110. The binder may be applied in the manner hereinbefore described by means 80 and 81 and the veil moved between corrugated rolls 108 which are disposed with their axes also extending transversely of the conveyor 110. Air jets 115 and 116 may be utilized, disposed respectively at each side of the veil, for effecting an undulating or swinging movement of the veil whereby it is deposited in a continuous series of laps or folds forming a laminar pack 522, the bight configurations 523 of which lie transversely of the conveyor as illustrated in Figure 20. The conveyor 110 moves the laminar pack assembly 522 into engagement with the compacting or felting rolls 158 which compress or flatten the laminae or layers of the pack into a more dense mat. The laminar mat, after passing the felting rolls, is conveyed through the crushing or sizing rolls and thence to a curing oven in the manner hereinbefore described after which the edges of the mat may be trimmed and the mat cut to desired size or shape.

It is to be understood that other means or apparatus for forming the fibers from fiber forming material may be employed such as a centrifugal mechanism wherein a stream of molten glass is caused to flow onto a rapidly rotating, substantially horizontal disk or wheel equipped to cause rapid radial movement of the fiber forming material in fine streams which are attenuated to fibers by centrifugal forces set up by the rapidly rotating disk. The fibers so formed may be collected upon relatively movable surfaces in thin layers or webs and processed according to the herein described method to a laminar mat construction.

It is apparent that, within the scope of the invention, modifications and different arrangements may be made other than is herein disclosed, and the present disclosure is illustrative merely, the invention comprehending all variations thereof.

What we claim is:

1. A method of forming and processing fibers from mineral material including the steps of flowing streams of fiber forming material from a supply; of attenuating the streams to fibers; of depositing the fibers in two collecting zones and onto relatively movable surfaces; of moving the layers of fibers on said surfaces into contiguous relation to form a veil of fibers; of directing a binding agent in comminuted form into the veil; of vibrating the veil to distribute the binding agent therethrough; of folding the veil upon itself to form a multilayer mat, and of moving the mat through a curing zone for curing the binding agent to establish mass integrity in the mat.

2. A method of forming and processing fibers including the steps of flowing streams of fiber forming material from a supply; of attenuating the streams to fibers; of depositing the fibers in a plurality of collecting zones to form individual layers of fibers; of moving the layers of fibers on said surfaces into contiguous relation to form a laminated veil of the fibrous layers; of entraining a binder in an air stream and projecting the binder into the veil whereby the binder is filtered out of the air by the veil; of vibrating the veil to distribute the binder throughout the veil; of folding the veil upon itself to form a laminar pack, and of moving the pack through a felting zone for reducing the pack to a mat wherein the layers of the veil are angularly related with respect to the major faces of the mat.

3. A method of processing fibers including the steps of delivering fibers to a collecting zone; of collecting the fibers in a web; of moving the web in a substantially vertical direction to a binder applying zone; of directing a binding material into the web; of vibrating the web to further distribute the binding material therein, and of depositing the web on a surface in a manner to form a laminated assemblage of the web.

4. A method of forming a laminar mat of mineral fibers including impregnating a moving layer of fibers with a binding material; applying gaseous blasts against the binder-impregnated layer of fibers to fold the layer in successive laps with the bight portions of the laps disposed at the edges of the multilayer mat formed by the successive laps; curing the binder in the mat, and trimming the edge portions of the mat to remove the bight portions of the laps.

5. A method of producing a continuous laminated body of fibrous material including the steps of flowing groups of streams of fiber forming material from a supply; of attenuating the groups of streams to form individual groups of fibers; of collecting the groups of fibers upon independent surfaces; of moving the surfaces in directions to bring the groups of fibers into contiguous relation to form a laminar body; of directing the laminar body away from the collecting surfaces in a substantially vertical direction; of delivering a bonding agent in a dry state into the body during vertical movement thereof, and of agitating the body to secure substantially homogeneous distribution of the bonding agent throughout the laminated fibrous body.

6. A method of fabricating a fibrous mat including the steps of attenuating streams of fiber forming material into fibers; of depositing the fibers upon a plurality of surfaces to form individual groups of fibers; of impressing a zone of reduced pressure adjacent each of the fiber supporting surfaces whereby the fibers are deposited in relatively thin webs; of moving the fiber supporting surfaces in directions to bring the webs of fibers into contiguous relation to form a multilayer body; of applying a bonding agent at both major surfaces of the body; of vibrating the body to distribute the bonding agent throughout the body of fibers; of moving the body of fibers in an undulating path and collecting the body in successive overlapping folds forming a laminar mat, and of curing the binder in the mat to impart mass integrity thereto.

7. A method of assembling fibers into mat configuration including the steps of attenuating heat softenable material to fibers; of collecting the fibers in separate zones; of bringing the collected groups of fibers into coextensive relation to form a laminar pack of overlapping groups of fibers; and of reducing the pack to form a laminated mat.

8. A method of processing mineral fibers including the steps of delivering fibers to a collecting zone; of continuously collecting the fibers in comparatively thin layers upon relatively movable surfaces; of continuously moving the surfaces to bring the fibrous layers into contiguous relation in a substantially vertical plane to form a fibrous veil; of applying a powdered binding material to the veil from each side thereof as the veil moves in a downward path; of agitating the binder laden veil to distribute the binding material throughout the veil; of imparting an undulating movement to the veil and concomitantly collecting the veil whereby a continuous assemblage of superposed layers of the veil is formed; of compacting the layers into mat formation, and subjecting the mat to elevated temperature in order to cure the binder.

9. A method of processing fibers including the steps of delivering fine fibers to a collecting zone; collecting the fibers in individual groups in thin layers upon foraminous surfaces; of causing movement of the surfaces to bring the layers into contiguous relation to form a fibrous veil; of applying a binding material in powdered form to the veil; of recovering fibers passing through the foraminous surfaces and delivering them to the fiber collecting zone for redeposition in said zone, and of recovering the excess binding material passing through the veil.

10. Apparatus of the character disclosed including, in combination, a pair of juxtaposed fiber collecting surfaces; means for delivering fibers to said surfaces whereby independent layers of fibers are continuously formed on said surfaces; means for continuously moving said surfaces in a direction bringing the collected layers of fibers into contiguous relation forming a dual-layer veil in fibers; means for delivering a comminuted binding agent into said veil of fibers, and means operable to fold the veil of fibers alternately upon itself to form a multilayer mat.

11. Apparatus for forming and processing fibers including a pair of fiber forming chambers; means for flowing a plurality of streams of fiber forming material into said chambers; means engageable with the streams for attenuating the same to fibers; a pair of relatively movable surfaces adapted to continuously collect the fibers formed in each chamber; said surfaces being movable in a direction bringing the collected fibers into a single layer of fibers; means including a delivery chute for conveying a comminuted binding agent into said layer of fibers; a member of resilient material adapted to engage the layer of fibers and vibrate the same to distribute the binding agent throughout the layer of fibers; a movable foraminous supporting surface upon which the layer of fibers is deposited; means operable to fold the layer of fibers alternately upon itself to form a multilayer mat, and an oven for curing the binder.

12. A method of processing fibers including the steps of continuously forming a body of fibers on a relatively movable surface; of causing movement of said surface to convey the fibrous body in a downward vertical direction; of concomitantly causing undulating movement of the body of fibers and collecting the body in successive overlapping layers upon a relatively movable conveyor surface angularly disposed with respect to a horizontal plane to accommodate the assemblage of layers and delivery thereof from the conveyor surface.

13. Apparatus for forming a laminated mat of fibers including, in combination, a relatively movable fiber collecting surface adapted to continuously receive and collect fibers in a layer thereon; means for moving said surface to continuously discharge the layer of fibers therefrom; a movable conveyor upon which the layer of fibers is connected; means including blasts of air alternately directed against opposite sides of the layer of fibers for folding the layer upon itself in successive laps as it is deposited upon the conveyor.

14. Apparatus of the character disclosed including, in combination, a relatively movable fiber collecting drum adapted to continuously receive and collect fibers of indiscriminate lengths in a layer thereon; means for moving said drum to continuously discharge the formed layer of fibers therefrom; means for impregnating the layer of fibers with comminuted binding material; means engageable with the binder impregnated layer for agitating the same; a movable conveyor inclined relative to the axis of the drum upon which the layer of fibers is collected, and means for folding the layer upon itself as it is deposited upon the conveyor to form a multilayer mat of fibers.

15. Apparatus for processing fibers including, in combination, a relatively movable member having a foraminous surface; means for continuously supplying fibers of indiscriminate lengths to said surface to form a layer of haphazardly arranged fibers thereon; means for establishing a zone of reduced pressure adjacent the foraminous surface to aid in collecting the fibers on said surface; a centrifugal separator for recovering those fibers which pass through the perforations in said surface; means for conveying the recovered fibers to a zone adjacent the fiber collecting surface for redeposition thereon; means for stripping the layer of fibers from the fiber collecting surface whereby said layer of fibers is moved downwardly in a substantially vertical direction; means for applying powdered binding material to said layer of fibers including means for establishing an air stream; feeding means for continuously delivering powdered binding material into the air stream whereby the binding material is projected into the layer of fibers by the air stream, and means including a centrifugal separator for recovering the excess binder for reuse.

16. Apparatus of the character disclosed including, in combination, a pair of relatively movable fiber collecting surfaces; means for continuously supplying fibers to said surfaces whereby a comparatively thin web of haphazardly arranged fibers is formed on each of said surfaces; means for moving the surfaces to bring the webs into contiguous relation forming a continuous veil of fibers, said surfaces being arranged to discharge the veil downwardly in a substantially vertical direction;

means for impregnating the veil with a bonding material; a relatively movable conveyor angularly inclined with respect to a horizontal plane upon which the veil is collected, and means for causing undulating movement of the veil whereby the same is collected in juxtapositioned layers forming a laminated fibrous mat.

17. Apparatus of the character disclosed, in combination, a pair of relatively movable fiber collecting surfaces; means for continuously supplying fibers to said surfaces whereby a comparatively thin web of fibers is formed on each of said surfaces; means for moving the surfaces to bring the webs into contiguous relation forming a continuous veil of fibers, said surfaces being arranged to cause the veil to move downwardly in a substantially vertical plane; means for impregnating the veil with a comminuted bonding material including a member disposed adjacent the veil for discharging the material; means for entraining the bonding material in an air stream whereby the material is conveyed into the veil by the air stream; a rotatable foraminous sleeve disposed adjacent the veil and opposite the material discharging member; a relatively stationary duct projecting into said sleeve; means for establishing a zone of reduced pressure in said duct and adjacent the foraminous sleeve whereby the excess bonding material passing through the veil is conveyed therefrom, and means associated with said duct for recovering the bonding material entering said duct for reapplication to the veil.

18. Apparatus for processing fibers including, in combination, a plurality of pairs of rotatable members having foraminous cylindrical surfaces; the members of each pair being in substantial parallelism and in juxtaposed relation; means for continuously supplying fibers to said members whereby a web of fibers is deposited on each of said members; means for actuating said members whereby the webs on the respective pairs of members are brought into contiguous relation to form a plurality of multiweb layers of fibers; means for applying a binder to the layers of fibers; a movable conveyor, and means for imparting swinging movement to the layers whereby the same are deposited in successive folds upon the conveyor forming superposed tiers of overlapping layers of fibers.

19. Apparatus of the character disclosed, in combination, means for flowing a plurality of streams of fiber forming material from a supply; a plurality of fiber forming chambers; means including gaseous blasts directed into the forming chambers into engagement with the streams to attenuate the streams to fibers of indiscriminate lengths; a fiber collecting surface individual to each forming chamber and adapted to collect fibers in haphazard relation in a comparatively thin web; means for moving the said surfaces to continuously convey the webs of fibers into contiguous relation to form a multilayer body of fibers; a binder applying means for impregnating the body of fibers with a binding agent; means for vibrating the body of fibers to distribute the binding agent throughout the body; a plurality of nozzles arranged adjacent the moving body of fibers; means for periodically and alternately establishing flow of a gas through said nozzles to set up an undulating movement of the fibrous body; a conveyor adapted to continuously receive the fibrous body in successive overlapping folds to form a laminated pack of fibers; a pack compacting means for interfelting the fibers to form a mat, and means for curing the binder.

20. An article of manufacture comprising an assemblage including a plurality of layers of glass fibers disposed in angular relation with respect to the major faces of the assemblage, each of said layers including a plurality of webs of fibers, and a binder distributed through the assemblage for imparting mass integrity thereto.

21. An article of manufacture comprising an assemblage of fibers including a plurality of overlapping layers of fibers disposed in echelon relation, each of said layers including a plurality of webs of haphazardly arranged fibers.

22. A method of forming a mat of fibers including forming fibers from flowable fiber-forming material, collecting the fibers in individual layers, moving the layers into contiguous relation to form a fibrous veil, and collecting the veil in successive displaced folds to form a mat of a plurality of thicknesses of the veil.

23. A method of processing fibers including the steps of delivering fibers to a collecting zone; of collecting the fibers in a web; of moving the web in a substantially vertical direction from the collecting zone whereby the web is suspended from the collecting zone, of directing a binder-laden air stream through the suspended web whereby the binder is filtered out of the air by the web, and depositing the web in overlapping layers to form a mat.

24. A method of processing fibers including the steps of continuously forming a layer of fibers on a surface movable about an axis; of conveying the layer of fibers away from the surface, and of collecting the layer in successive overlapping folds upon a support inclined in a direction relative to the axis of the movable surface whereby the folds lie in planes substantially parallel to the axis of movement of the surface.

25. A method of processing fibers including the steps of collecting groups of fibers upon independent surfaces; moving the surfaces in directions to bring the groups together to form a veil and to convey the formed veil in a downward vertical direction; concomitantly causing swinging movement of the veil of fibers, and collecting the veil in successive laps in echelon relation upon a relatively movable support angularly disposed with respect to a horizontal plane.

26. A fibrous mat comprising an assemblage of mineral fibers including a plurality of progressively overlapping layers of fibers disposed in angular relation with respect to the major surfaces of the assemblage, each of said layers including a plurality of thin webs of fibers disposed in contiguous relation, the adjacent layers adhering together through felting of the fibers at the surfaces of the layers.

References Cited in the file of this patent

UNITED STATES PATENTS

| | | |
|---|---|---|
| 1,656,828 | Powell | Jan. 17, 1928 |
| 2,188,373 | Pearce | Jan. 30, 1940 |
| 2,288,072 | Collins | June 30, 1942 |
| 2,372,433 | Koon | Mar. 27, 1945 |
| 2,409,066 | Powell et al. | Oct. 8, 1946 |
| 2,450,916 | Coss et al. | Oct. 12, 1948 |
| 2,467,291 | Brelsford | Apr. 12, 1949 |
| 2,477,555 | Roberts et al. | July 26, 1949 |
| 2,503,067 | Powell | Apr. 4, 1950 |
| 2,528,091 | Slayter | Oct. 31, 1950 |
| 2,646,381 | Duvall | July 21, 1953 |
| 2,671,496 | Chavannes et al. | Mar. 9, 1954 |